Feb. 14, 1933.    R. W. THOMAS    1,897,169
WEIGHING MECHANISM
Filed Feb. 14, 1930
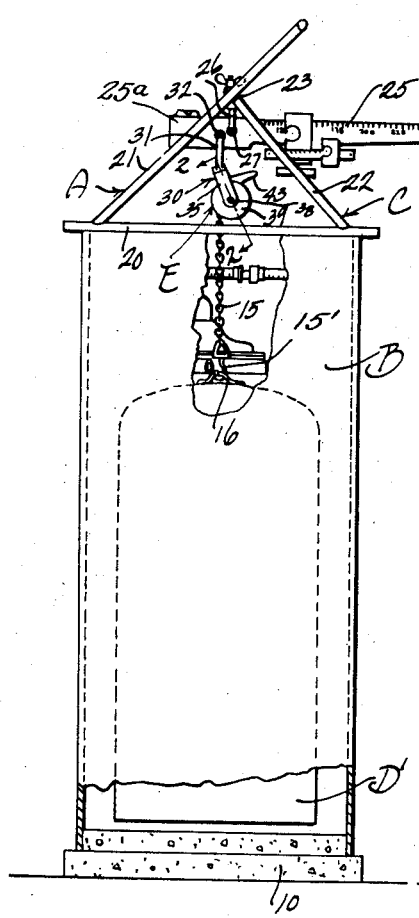
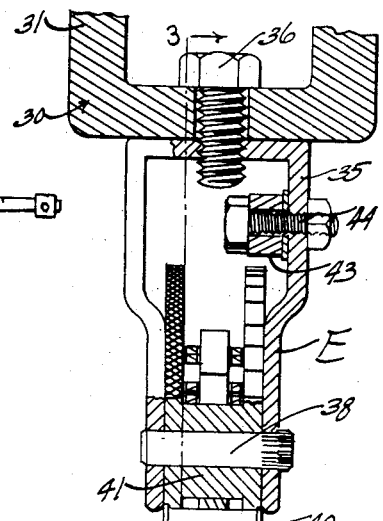
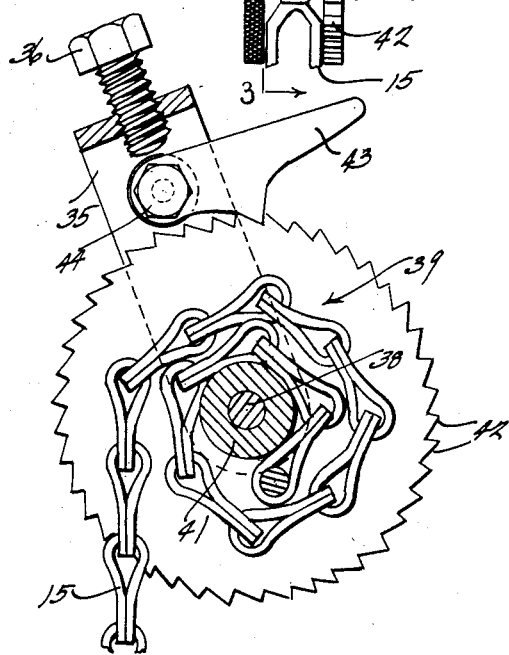
INVENTOR.
Rosswell W. Thomas
BY *Lancaster, Allwine & Rommel*
ATTORNEYS.

Patented Feb. 14, 1933

1,897,169

UNITED STATES PATENT OFFICE

ROSSWELL W. THOMAS, OF DETROIT, MICHIGAN, ASSIGNOR TO PHILLIPS PETROLEUM COMPANY, OF BARTLESVILLE, OKLAHOMA, A CORPORATION

WEIGHING MECHANISM

Application filed February 14, 1930. Serial No. 428,502.

This invention relates to improvements in weighing mechanism particularly well adapted for transportation from place to place, to permit of the expeditious weighing of loads, such as liquid gas and their containers.

The primary object of this invention is the provision of weighing apparatus generally adapted for use similar to that set forth in an application for patent of Paul S. Endacott, relating to weighing apparatus for tank contained liquefied gas, Serial No. 381,503, filed July 27, 1929, which embodies improvements thereover in that there is associated with a supporting frame, a balance beam, which may act as a hand lever, and load supporting means including a longitudinally adjustable device which enables a very quick and efficient attachment, weighing, and disconnection of parts.

Other objects and advantages of this invention will be apparent during the course of the following detailed description.

In the drawing, wherein for the purpose of illustration is shown only a preferred embodiment of the invention, Figure 1 is a view in side elevation with parts broken away to disclose details and showing the improved weighing mechanism in position supporting a load to be weighed.

Figure 2 is an enlarged sectional view taken substantially on the line 2—2 of Figure 1.

Figure 3 is a sectional view taken substantially on the line 3—3 of Figure 2.

In the drawing, wherein similar reference characters designate corresponding parts throughout the several views, the letter A may generally designate the improved weighing mechanism which is adapted to be removably positioned upon a housing B for the weighing of a load D' while therein, the load in the example shown being a customer's tank for liquefied gas, vertically movable in the housing. The weighing mechanism A preferably comprises a frame C which may be of any approved type, whereon a balance beam D is mounted in approved or conventional relation, and with which is associated a longitudinally adjustable device E in an approved relation.

The frame C, in the example shown, is of the type set forth in a co-pending application of Hurlbert R. Bridgewater, Serial No. 428,479, filed Feb. 14, 1930, although it may be of any type. It comprises an open base portion 20 adapted to be supported upon the top of the housing B in a removable relation; the base 20 comprising merely supporting bars to which are connected upwardly convergent bars 21 and 22, in any approved number, welded or otherwise secured at their upper ends at 23, where suitable means is provided for supporting a balance beam 25 in depending pivoted relation. This means may include a yoke 26 swivelly connected at 27 near one end of the beam 25.

The yoke 26 supports the beam 25 so that a minor portion $25^a$ thereof, (to one side of the pivot 27) is located above the central portion of the open base portion 20 of frame C, and a major portion $25^b$ of beam 25 (to the other side of the pivot 27) extends laterally of the frame C, an appreciable distance to act as a hand lever as shown in Figure 1, and as hereinafter more fully described.

In the specific example shown the housing B and the customer's tank D', hereinafter referred to as the load, both normally rest upon a foundation 10. The longitudinally adjustable device E, in the example shown comprises a windlass such as is shown in Patent 1,834,480 granted December 1, 1931, and while well adapted for the purpose of a take-up device between the balance beam D and the load D', the present invention is not limited to its use.

The longitudinally adjustable device E preferably comprises a frame 30, shown best in Figure 1, including an upper preferably straight yoke portion 31 swiveled at 32 to the minor portion $25^a$ of the beam 25 in depending relation from the latter and close to but longitudinally offset upon the beam with respect to the pivot 27 of the means which supports the beam. The frame 30 also includes an inverted U-shaped lower yoke 35, which, as is shown in Figure 2, is detachably connected by a bolt 36 to the lower end of the upper yoke portion 31, in a rigid relation therewith. The upper and lower portions 31 and 35 are connected in a substantially obtuse angular relation, that is, the connected ends thereof are offset to one side of a straight line drawn to intersect the axis of the pivot 32 and the axis of the drum pivot 38 at the lower end of the frame portion 35, whereon the drum 39 of the windlass is rotatably mounted. This drum 39 is of the grooved pulley type, and has been specifically described in the aforesaid Patent 1,834,480. It has spirally wound thereon a cable 15, which is secured at 40 on the drum near the hub portion 41 thereof by a hook 15' engaging an eye 16 on the tank D'. This drum 39 is provided with an annular series of ratchet teeth 42 thereon, whereon a pawl 43 acts; this pawl 43 being pivoted at 44 and gravity operated to engage the teeth 42 to act in restraining movement of the drum 39 in one direction, as is quite apparent from Figure 3. The cable 15 is so spirally wound upon the drum that the free depending end thereof, particularly when supporting the load D', or drawn taut therewith, aligns with the upper straight portion 31 of the frame. It can therefore be seen that the offset in the frame 30 is of importance, since it properly positions the drum to best aid in the connection of a load with the balance beam, as can be seen from Figure 1 of the drawing.

In practice various sizes of customers' tanks D' are used altho the housings B may be of uniform size. Some of the customers' tanks are higher than others so that some installations may have the top of the customer's tank D' near the top or mouth of the housing B, whereas, with other installations, the top of the tank D' may be a considerable distance below said top or mouth. This is one of the reasons for providing the longitudinally adjustable device E. When a tank and its contents is to be weighed, the service man arranges the frame C centrally over the housing B, and because the device E is connected to the minor portion 25$^a$ of beam 25, which portion is above the central portion of base 20, the device E will be suspended over substantially the central portion of tank D' and when the tank is lifted there is no danger that it will rub against the interior surface of the housing if the service man has exercised reasonable care in locating the base 20 of frame C substantially symmetrically over the housing B. With the beam 25 in a position so that its major portion 25$^b$ extends upwardly and diagonally with respect to frame C, and the hook 15' engaging the eye 16, the device E may be manipulated or adjusted longitudinally to act as a link between the minor portion 25$^a$ of the beam 25 and the tank D'. Then, by grasping the major portion 25$^b$ of the beam 25, so that it acts as a hand lever, the service man may lift the tank D' from the foundation 10 by swinging this portion 25$^b$ downwardly. The tank D' and its contents may then be weighed, (to determine how much liquefied gas the customer has used since the last filling of the tank) an additional supply of liquefied gas may then be introduced into the tank, and the tank and its contents again weighed so that an entry may be put in the service man's book as to the quantity of liquefied gas made available to the customer after the servicing operation. The tank D may be lowered to rest upon the foundation 10 by again tilting the beam 25, and the weighing equipment detached from the tank by manipulating the longitudinally adjustable device E as is obvious from an inspection of the drawing.

Various changes in the shape, size, and arrangement of parts may be made to the form of invention herein shown and described without departing from the spirit of the invention or the scope of the claim.

I claim:

In weighing mechanism of the class described, the combination with a customer's tank, and a housing for receiving the customer's tank in a vertically movable relation therein, of a portable frame removably disposed upon said housing, a scale including a balance beam pivotally carried by said frame and having a minor portion to one side of the pivot above the central portion of said housing and a major portion to the other side of the pivot, extending laterally beyond the frame and housing, and a longitudinally adjustable device adapted for detachable connection to the tank and pivotally connected to the minor portion of said balance beam, whereby tanks of different heights may be initially connected to said scale through said longitudinally adjustable device and subsequently lifted by swinging of said balance beam.

ROSSWELL W. THOMAS.